United States Patent
Mayer

(10) Patent No.: US 7,092,601 B2
(45) Date of Patent: Aug. 15, 2006

(54) THIN FILM FILTER WITH WAVEGUIDE SUBSTRATE

(75) Inventor: Hans-Peter Mayer, Ditzingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/716,467

(22) Filed: Nov. 20, 2003

(65) Prior Publication Data

US 2004/0109645 A1 Jun. 10, 2004

(30) Foreign Application Priority Data

Dec. 3, 2002 (EP) ................................ 02360333

(51) Int. Cl.
*G02B 6/30* (2006.01)
*H04J 14/02* (2006.01)

(52) U.S. Cl. ............................ 385/49; 385/14; 385/129; 385/130; 385/131; 398/79; 398/85

(58) Field of Classification Search ................ 385/14, 385/49, 38, 42, 88, 89, 92, 94, 129, 131, 385/130; 398/79, 85
See application file for complete search history.

(56) References Cited

U.S. PATENT DOCUMENTS

| 4,233,506 A | * | 11/1980 | Yamamoto et al. ..... 250/227.11 |
| 4,358,851 A | | 11/1982 | Scifres .......................... 372/97 |
| 4,732,446 A | * | 3/1988 | Gipson et al. ................ 385/24 |
| 4,787,696 A | * | 11/1988 | Norris et al. ................. 385/89 |
| 5,037,180 A | | 8/1991 | Stone ......................... 385/123 |
| 5,195,150 A | * | 3/1993 | Stegmueller et al. ......... 385/33 |
| 5,321,251 A | * | 6/1994 | Jackson et al. .......... 250/208.1 |
| 5,521,992 A | * | 5/1996 | Chun et al. ................... 385/14 |
| 5,863,449 A | | 1/1999 | Grabbe ......................... 216/24 |
| 5,966,478 A | * | 10/1999 | Marcuse et al. .............. 385/14 |
| 6,094,291 A | * | 7/2000 | Kashyap ..................... 359/245 |
| 6,438,291 B1 | * | 8/2002 | Duck et al. ................... 385/34 |
| 6,909,830 B1 | * | 6/2005 | Lee et al. .................... 385/125 |
| 2002/0168157 A1 | * | 11/2002 | Walker et al. .............. 385/115 |
| 2002/0197008 A1 | * | 12/2002 | Kim et al. .................... 385/24 |
| 2003/0147589 A1 | * | 8/2003 | Patoz ........................... 385/37 |
| 2004/0013359 A1 | * | 1/2004 | Lee et al. ..................... 385/31 |
| 2004/0109235 A1 | * | 6/2004 | Zhong et al. ................ 359/634 |

FOREIGN PATENT DOCUMENTS

| EP | 0 649 038 A1 | 4/1995 |
| EP | 1 079 252 A2 | 2/2001 |
| WO | WO 02 084353 A1 | 10/2002 |

\* cited by examiner

*Primary Examiner*—Brian M. Healy
(74) *Attorney, Agent, or Firm*—Sughrue Mion, PLLC

(57) ABSTRACT

A planar lightwave circuit (PLC) (1; 20) comprises an optical device, where the optical device comprises at least one piece of waveguide structure (5; 24), in particular one piece of fiber, which has at least one thin film layer deposited on an end facet (9; 28). Thus, a thin film filter can be integrated in a PLC with minimized insertion loss and high mechanical stability for athermalization.

16 Claims, 3 Drawing Sheets

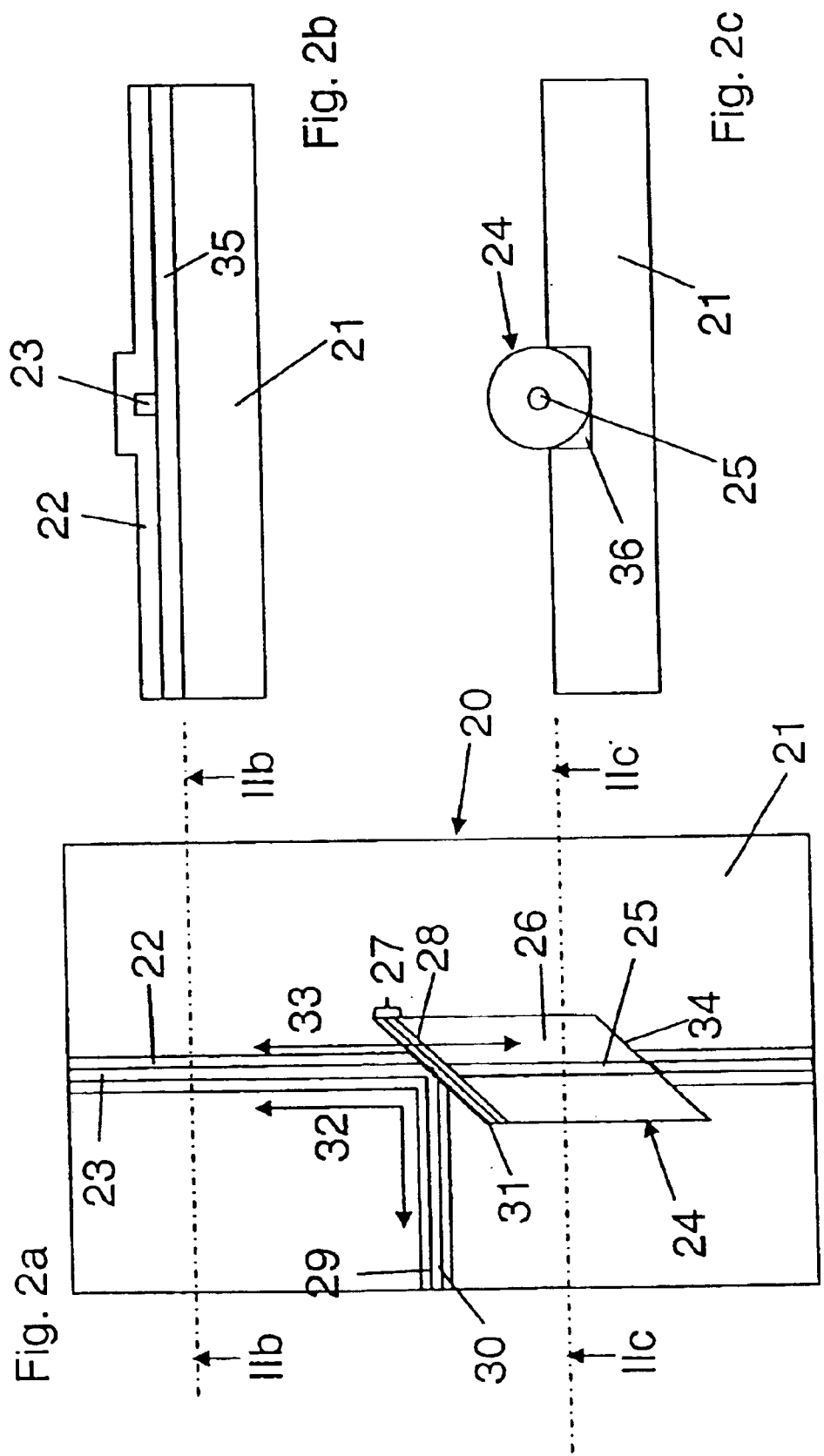

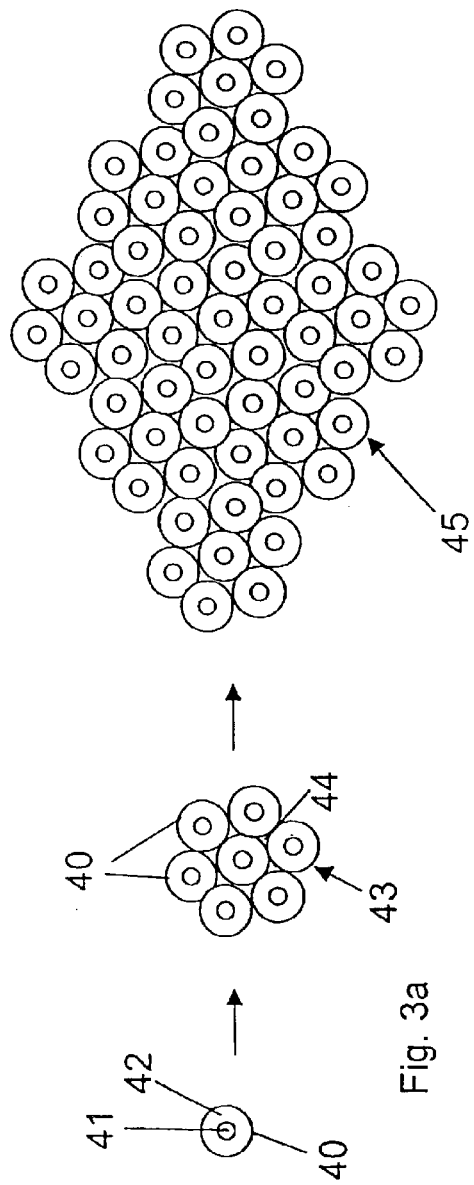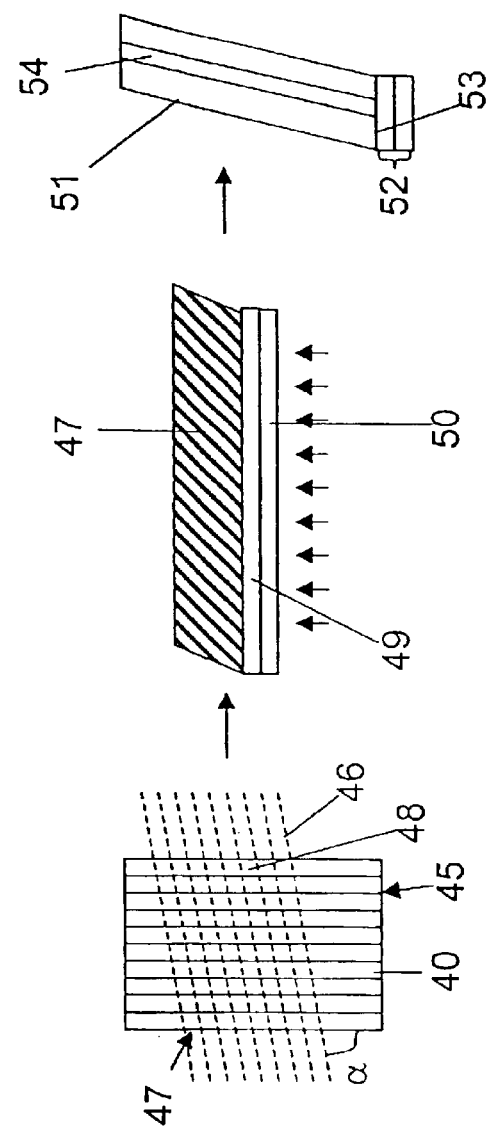
Fig. 3a
Fig. 3b ated into a slit in a planar optical waveguide (filter on glass approach). This approach has to compromise between the use of a thick glass substrate for the inserted thin film filter, which is mechanically stable but leads to increased insertion loss due to non-guided coupling between the waveguides of the planar lightwave circuit and the use of a thin substrate for the thin film filter. The thickness of the thin substrate is in the order of a few micrometers. This limits the design of a multilayer thin film filter, e.g. with respect to athermalization. Temperature variations lead to bowing of the substrate, resulting in a change of the filter characteristics. Furthermore, thin substrates are difficult to handle and to attach in a narrow slit of the planar lightwave circuit.

THIN FILM FILTER WITH WAVEGUIDE SUBSTRATE

BACKGROUND OF THE INVENTION

The invention is based on a priority application EP 02360333.5 which is hereby incorporated by reference.

The invention relates to a planar lightwave circuit (PLC) comprising an optical device.

Filtering or duplexing functions are needed in many parts of an optical network, p.ex. as multiplexers, demultiplexers, in optical amplifiers, and as band filters. These functions can be realized using thin film filters or mirrors. To this end it is desirable to integrate a thin film filter within a planar waveguide.

It is known to insert a small piece of a multilayer thin film filter deposited on a bulk glass substrate with narrow tolerances into a slit in a planar optical waveguide (filter on glass approach). This approach has to compromise between the use of a thick glass substrate for the inserted thin film filter, which is mechanically stable but leads to increased insertion loss due to non-guided coupling between the waveguides of the planar lightwave circuit and the use of a thin substrate for the thin film filter. The thickness of the thin substrate is in the order of a few micrometers. This limits the design of a multilayer thin film filter, e.g. with respect to athermalization. Temperature variations lead to bowing of the substrate, resulting in a change of the filter characteristics. Furthermore, thin substrates are difficult to handle and to attach in a narrow slit of the planar lightwave circuit.

Alternatively it has been suggested to deposit a filter layer stack upon a polished edge of a planar lightwave circuit. This, however, can only be used in cases where the filter or mirror can be placed at the edge of the die layout. Furthermore, the polishing and coating processes work only for single pieces or small batches, leading to high costs of fabrication.

The use of lattice-type filters such as Mach-Zehnder structures or arrayed waveguide gratings has also been suggested. However, lattice-type filters with sharp filter characteristics are generally large compared with thin film filters having comparable performance. In addition, athermalization of lattice-type filters is difficult to achieve.

SUMMARY OF THE INVENTION

It is the object of the invention to integrate a thin film filter or mirror within a planar lightwave circuit with minimized insertion loss and high mechanical stability for athermalization.

This object is achieved by a planar lightwave circuit (PLC) comprising an optical device, where the optical device comprises at least one piece of waveguide structure, which has at least one thin film layer deposited on an end facet. The waveguide structure serves as a solid substrate for the thin film or a stack of thin film layers and at the same time as an optical waveguide. By using a thick waveguide structure, the optically non-guided path can be limited to the thickness of the thin film layer or thin film layer stack, i.e. a few micrometers. Thus, in contrast to the filter on glass approach, insertion loss is minimized because a waveguide structure is used as substrate. Due to the thick, mechanically stable waveguide structure athermalization can be obtained by using a thin film multilayer stack. Preferably, the waveguide structure is a piece of fiber, i.e. a short fiber rod. In particular fiber rods are mechanically more stable than very thin substrates as in the filter on glass approach of the state of the art. The optical device according to the invention is hence suited for automated mounting. Many types of fiber can be used since no fiber splicing is involved in the fabrication of the optical device. The fiber can be freely chosen, p.ex. doped fiber for insertion of a doped gain segment, potentially combined with double-clad type fiber for use of multi-source-pumping. Since the fiber rod is mechanically stable and well protected after assembly, it is possible to use a wide variety of glass materials, dopants and dopant concentrations for the fiber. However, the invention is not limited to the use of an optical fiber as waveguide structure. Any waveguiding material can be used as waveguide structure.

In a preferred embodiment the thin film or thin film layer stack is a filter. The filter either transmits or reflects light, depending on the wavelength of the light. Thus, according to the invention, thin film filters, which are the best choice for many applications, can be easily integrated into standard processes for manufacturing a PLC. In the same way, other thin film devices such as saturable absorbers can be used. There are only negligible constraints for the layout of the PLC. Thin film filters are technically well mastered and can be realized at low cost. The invention allows their integration into planar PLCs with minimized insertion loss and high mechanical stability for athermalization. For realizing the filter between 1 and more than 30 thin (in the order of an optical wavelength) dielectric or metallic films with different thickness, different refractive index and reflectivity may be used. Preferred materials are zinc sulfide, lead fluoride, cryolite, sodium hexafluoroaluminate, aluminium, silver, gold, titanium dioxide, silicon dioxide, tantalum pentoxide. However, other materials may also be used.

Advantageously, the optical device is provided in a recess of the planar lightwave circuit. Thus, the optical device can be easily coupled to waveguides located on the PLC. The recess can be fabricated by dry-etching. The angle of the end facet and the corresponding facet on the PLC can be chosen such that reflections are minimized.

In a particularly preferred embodiment an index-matching material is located between one or both end facets of the waveguide structure and/or outer surface, in the case where a thin film is deposited on the end facet, and the corresponding facet of the planar lightwave circuit. If a material with a refractive index different from that of the waveguide structure and the PLC is present between the facets, i.e. air, reflections occur. Reflections can be minimized by use of the index-matching material, p.ex. a liquid or a silicon which may be cured. If light is to be coupled into the cladding of a waveguide, p.ex. in so called cladding pumped fibers, the optical device is particularly suited for coupling light into the cladding.

With an appropriate layout of the planar lightwave circuit and proper choice of the angle of the end facet, a duplexer can be realized with the optical device according to the invention.

A fiber array comprising at least one bundle of fibers where at least at one end the end facets of the fibers comprise a thin film, also falls within the scope of the invention. By coating a bundle of fibers with a thin film the optical device described above can be manufactured in a cost-effective way.

The problem is also solved by a method of processing an optical device comprising the following steps:

a) sawing of the fiber into pieces or a fiber array into fiber array plates at a predefined angle with respect to the fiber axis b) deposition of at least one thin film on at least one end facet of the fiber piece or the fiber array plate.

Sawing at a predefined angle allows choosing the angle of the end facet with respect to the axis of the fiber according to the application the fiber is supposed to be used for. By sawing and coating an array of fibers the optical device and thus the integrated PLC can be fabricated in a cost effective way.

In a preferred variant of the inventive method the array of fibers is obtained by first bundling individual fibers to a fiber bundle, where the fibers are held together by a matrix material and second by joining the fiber bundles to a fiber array using the matrix material for holding together the fiber bundles, and third consolidating the matrix material. Thus, several fibers can be sawed at a defined angle and coated with one or more thin film layers at the same time. As matrix material p. ex. a polymer can be used.

In a further advantageous variant of the method the fiber end facet or the fiber array plate is polished prior to deposition of the thin film. Thus, the length of the fibers, respectively the thickness of the fiber array plate, can be precisely controlled. By polishing the fiber array plate the end facets of the fiber pieces making up the fiber array plate are polished at the same time. Exactly the same facet angle for a batch of fiber pieces is thereby ensured If the fiber pieces of the fiber array plate are separated after thin film deposition, the individual optical devices can be easily joined with the PLC. For example, the optical devices can be glued into the recess. Thereby the glue may be the index-matching material as well. Alternatively, the optical devices could be bonded to the PLC using a method known per se.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

BRIEF DESCRIPTION OF THE DRAWINGS

The invention is shown in the drawing.

FIG. 2a shows a section in the plane of a second embodiment of the inventive PLC;

FIG. 2b shows a cross-section through the PLC of FIG. 2a along the line IIb—IIb;

FIG. 2c shows a cross-section through the PLC of FIG. 2a along the line IIc—IIc;

FIG. 3a shows the fabrication of a fiber array;

FIG. 3b shows the method steps of fabricating the optical device to be integrated with a PLC.

FIG. 1 shows a plane of a first planar lightwave guide PLC 1 containing the waveguiding paths, i.e. a longitudinal section through the first planar lightwave guide PLC 1. The PLC 1 is built on a substrate 2. Within the substrate 2 is provided a cladding layer 3 and embedded in the cladding layer 3 is a slab 4 for transmitting light. The slab 4 and cladding layer 3 form a slab waveguide. The slab waveguide is interrupted by a recess. Within the recess is provided a waveguide structure 5 implemented by a fiber. The core layer 6 of the fiber is surrounded by a cladding 7. At one end a thin film layer stack 8 with an outer surface 10 is provided on the end facet 9 of the waveguide structure 5, wherein the thin film layer stack 8 is a filter or a mirror, depending on the wavelength. In this case, the end facet 9 is perpendicular to the axis of the waveguide structure 5. The shape of the recess is adapted to the shape of the waveguide structure, in particular to the angle of the facet 9 with respect to the axis of the waveguide structure. The stack 8 acts as a filter layer, allowing only light of a certain wavelength to pass, which is indicated by arrow 11. Other wavelengths of light are reflected. At the bottom end of the waveguide structure 5 is provided a tolerance gap 12, which can be held relatively small, i.e. between 1 and 3 µm. Numeral 13 indicates the facet of the waveguide structure 5. Light is guided in the slab 4 of the slab waveguide and in the core layer 6 of the waveguide structure 5. Hence, the only regions not guiding the transmitted light are the tolerance gap 12 and the thin film layer stack 8. The length of the non-guided path is thus minimized and insertion loss kept low.

FIG. 2a shows a plane of a second PLC 20 containing the waveguiding paths. The PLC 20 is built on a substrate 21. Within the substrate 21 is provided a first cladding layer 22 and embedded in the first cladding layer 22 is a first slab 23 for transmitting light. The first slab 23 and first cladding layer 22 form a first slab waveguide. The first slab waveguide is interrupted by a recess. Within the recess is provided a waveguide structure 24 realized by a core layer 25 of a fiber, which is surrounded by a cladding 26. At one end a thin film layer stack 27 is provided on the end facet 28 of the waveguide structure 24, the other end is the facet 34. In this case, the end facet 28 is inclined with respect to the axis of the waveguide structure 25. Perpendicular to the first cladding layer 22 and the first slab 23 is provided a second cladding layer 29 and a second slab 30 forming a second slab waveguide. The first and second slab 23, 30 meet at one end of the recess. The interface 31 of the layer stack 27 is again the outer surface of the filter stack, and thus of the optical device. Light transmitted downwards along arrow 32 having a first wavelength is reflected at the layer 31. Light at a different wavelength transmitted downwards along path 33 is transmitted through the layer 31. Thus, the waveguide structure 24 acts as a 1:2 demultiplexer. In the opposite direction along paths 32, 33 the waveguide structure 24 acts as 2:1 multiplexer.

FIG. 2b is a cross-section along the line IIb—IIb of the PLC 20 in FIG. 2a: On top of the substrate 21 is deposited a third cladding layer 35. The third cladding layer 35 and the first cladding layer 22 embed the slab 23, thus forming a slab waveguide.

FIG. 2c shows a cross-section along the line IIc—IIc of the PLC 20 in FIG. 2a. Within the substrate 21 is provided a recess 36 in which the waveguide structure 24 can be arranged. The depth of the recess 36 is chosen so the core layer 25 of the fiber is at the same height as the first and second slab 23, 30. Thus light can be coupled from the core layer 25 into the slab 23 and vice versa, and from the first slab 23 into the second slab 30 and vice versa.

FIG. 3a shows in a schematic way the fabrication of a fiber array. Several single fibers 40 shown in cross-section with a core 41 and cladding 42 are bundled to a fiber bundle 43, which is held together by a matrix filling material 44, p.ex. a polymer. Subsequently, several fiber bundles 43 are attached to one another by a filling material to form a fiber array 45, also called fiber ingot. Advantageously the same filling material is used for the fiber bundle 43 and for the fiber array 45. Before further processing the fiber array 45, the matrix material holding together the fiber array 45 is consolidated.

FIG. 3b shows the subsequent processing of the fiber array 45 of FIG. 3a. The fiber array 45 is sawn along the dashed lines 46 into fiber array plates 47 at an angle α determined by the application the fibers 40 are intended for. Sawing offers precise control of the angle α with respect to the fiber axis. After sawing the fiber array plates 47 consisting of many fiber pieces 48 are polished on at least one end face. By polishing, the length of the fiber pieces 48 can be precisely controlled. After polishing, one or several thin films 49, 50, depending on the application, are deposited on the fiber array plates 47, i.e. on the polished end facets of the fiber pieces 48. Then the matrix filling material 44 is removed and individual fiber pieces 51 with a thin film layer stack 52 provided on their end facet 53 are obtained. The fiber pieces 51 can then be integrated into a PLC. The fiber piece 51 is shown in a cross-section through the core layer 54.

Figure 1:
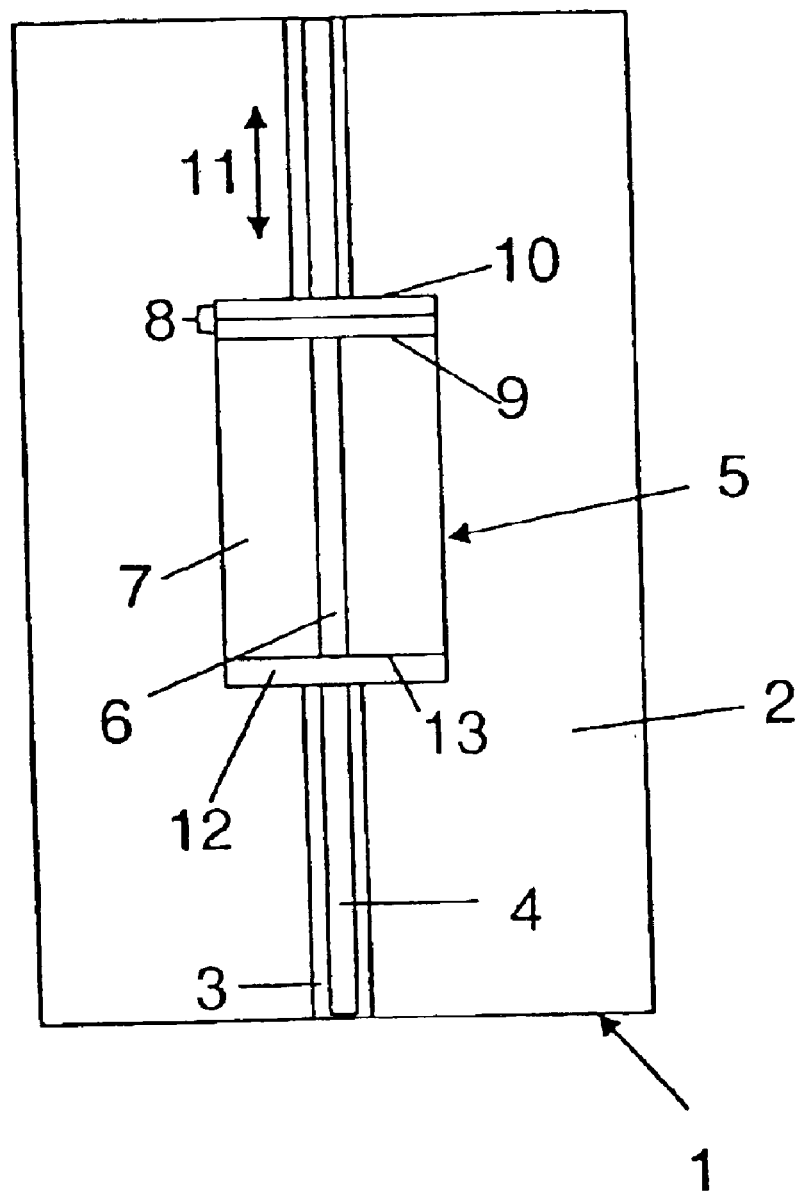
FIG. 1 shows a section in the plane of a PLC with a waveguide structure.

A planar lightwave circuit (PLC) 1; 20 comprises an optical device, where the optical device comprises at least one piece of waveguide structure 5; 24, in particular one piece of fiber, which has at least one thin film layer deposited on an end facet 9, 28. Thus, a thin film filter can be integrated in a PLC with minimized insertion loss and high mechanical stability for athermalization.

I claim:

1. Planar lightwave circuit comprising an optical device, where the optical device comprises at least one piece of waveguide structure which is a piece of fiber that has at least one thin film layer deposited on an end facet,
   wherein the thin film is a filter or a saturable absorber.

2. The planar lightwave circuit according to claim 1, wherein the optical device is provided in a recess of the planar lightwave circuit.

3. Planar lightwave circuit according to claim 1, wherein an index-matching material is located between the optical device and the planar lightwave circuit.

4. Planar lightwave circuit according to claim 1, wherein the planar lightwave circuit is a duplexer.

5. A fiber array comprising at least one bundle of fibers, wherein at least one end facet of each fiber comprises a thin film, and
   wherein the thin film is a filter or a saturable absorber.

6. Method of processing an optical device comprising the following steps:
   (a) sawing of a fiber into pieces or a fiber array into plates at a predefined angle with respect to the fiber axis;
   (b) depositing at least one thin film on at least one end facet of the fiber piece or the fiber array plate;
   wherein the thin film is a filter or a saturable absorber.

7. A method of processing an optical device comprising the following steps:
   (a) sawing of a fiber into pieces or a fiber array into plates at a defined angle with respect to the fiber axis;
   (b) depositing at least one thin film on at least one end facet of the fiber piece or the fiber array plate,
   wherein the array of fibers is obtained by first bundling individual fibers to a fiber bundle, where the fibers are held together by a matrix material and second by joining the fiber bundles to a fiber array using the matrix material for holding together the fiber bundles, and third consolidating the matrix material.

8. Method according to claim 6, wherein the fiber end facet is polished prior to deposition of the thin film.

9. A method of processing an optical device comprising the following steps:
   (a) sawing of a fiber into pieces or a fiber array into plates at a predefined angle with respect to the fiber axis;
   (b) depositing at least one thin film on at least one end facet of the fiber piece or the fiber array plate,
   wherein the fiber pieces of the fiber array plate are separated after thin film deposition.

10. A planar lightwave circuit comprising:
    an optical device that is integrated into the planar lightwave circuit structure,
    wherein the optical device comprises at least one waveguide structure,
    wherein the at least one waveguide structure comprises at least one thin film layer deposited on an end facet thereof,
    wherein the at least one waveguide structure is an optical fiber having a core and a cladding, and
    wherein the at least one thin film layer is a filter or a saturable absorber.

11. The planar lightwave of claim 1 wherein the thin film is a transmissive filter.

12. A planar lightwave circuit comprising an optical device, where the optical device comprises at least one piece of waveguide structure, which is a piece of fiber that has at least one thin film layer deposited on an end facet,
    wherein the thin film is a saturable absorber.

13. The planar lightwave circuit according to claim 1, wherein the planar lightwave circuit is a de-multiplexer.

14. The planar lightwave circuit according to claim 1, wherein the planar lightwave circuit is a multiplexer.

15. A planar lightwave circuit comprising:
    a planar waveguide interrupted by a recess to form two planar waveguide portions;
    an optical fiber disposed in the recess optically coupling the two planar waveguide portions; and
    at least one thin film layer at one end facet of the optical fiber.

16. The planar lightwave circuit of claim 15, wherein the optical fiber is configured to transmit light in substantially a straight line between the two planar waveguide portions.

* * * * *